Oct. 15, 1946. C. W. LEGUILLON ET AL 2,409,502
TRACK FOR SELF-LAYING TRACK TYPE VEHICLES
Filed June 22, 1943
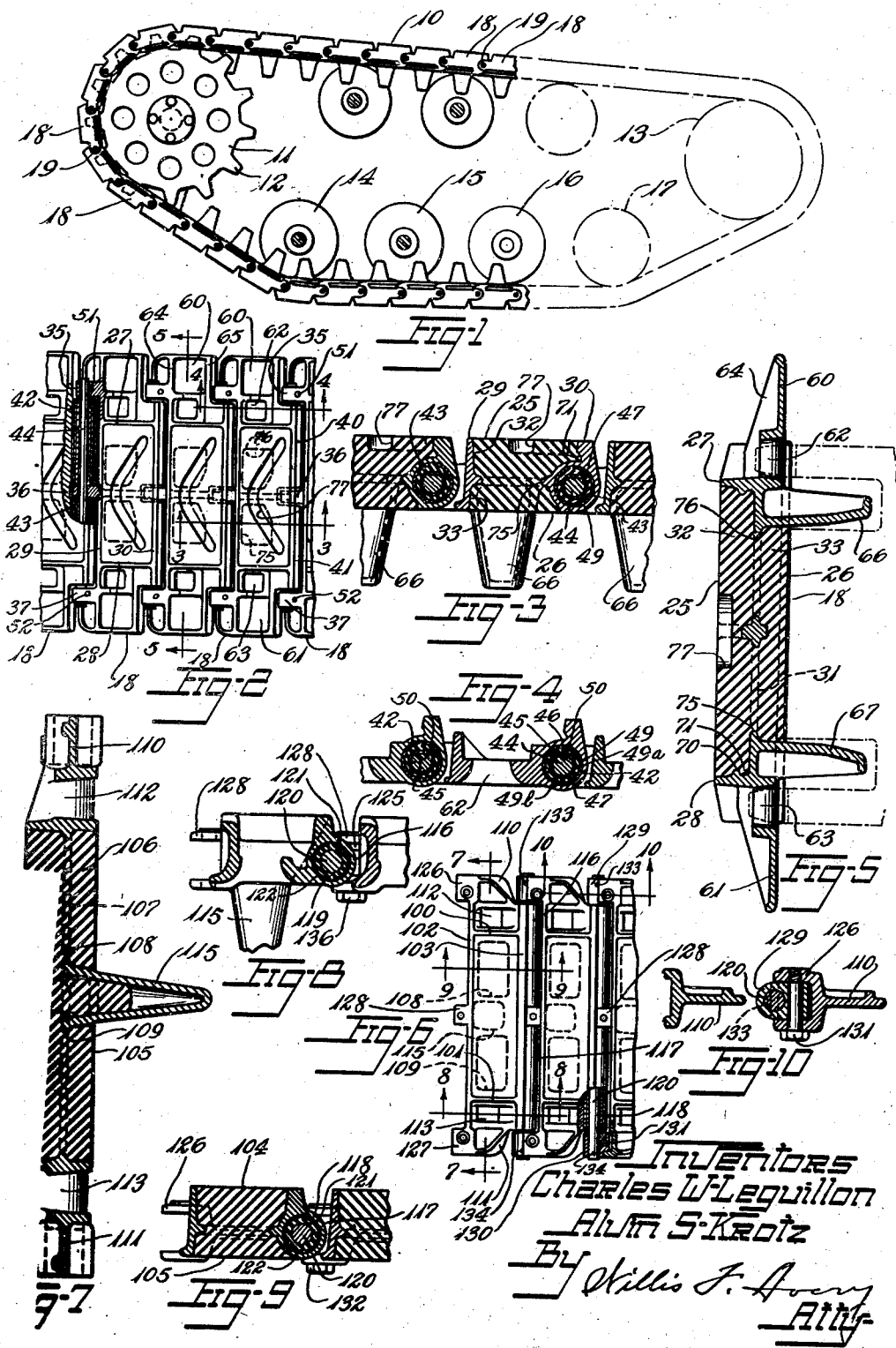

Patented Oct. 15, 1946

2,409,502

UNITED STATES PATENT OFFICE 2,409,502

TRACK FOR SELF-LAYING TRACK TYPE VEHICLES

Charles W. Leguillon and Alvin S. Krotz, Akron, Ohio, assignors to The B. F. Goodrich Company, New York, N. Y., a corporation of New York Application June 22, 1943, Serial No. 491,760

6 Claims. (Cl. 305—10)

This invention relates to track for self-laying track type vehicles, and more especially to track blocks therefor.

In the use of self-laying track type vehicles it has been found that track blocks of metal could be used to advantage on soft terrain but these have not provided the desired traction on hard pavements or the like. Furthermore, their use has been limited to slow vehicle speeds. Track blocks having tread surfaces of resilient rubber or other rubber-like material have been found to provide greater traction on hard pavements and the like, and to provide more quiet operation at higher speeds with less damage to the pavement. Such blocks as constructed heretofore, however, have been found to suffer rapid deterioration due to cracking and spalling of the resilient composition especially where it has been attempted to employ synthetic rubber or rubber-like compositions for the resilient face of the block. Furthermore, the use of tracks having resilient treads has been confined to light vehicles due to tendency of the resilient material to spread and separate under heavy pressure.

The present invention aims to overcome these and other difficulties.

The principal objects of the present invention are to provide a composite track block structure having good traction properties on hard pavement or soft terrain, to provide for retaining the resilient material and preventing excessive spreading and cracking or spalling thereof, to provide high mechanical strength with adequate resilient cushioning, to provide cushioning of the bogie wheels, to provide a resilient support directly from the bogie wheels to the ground, to provide for interlocking of the resilient rubber-like material with the metal without requiring bonding, to provide a construction in which the resilient rubber-like material may be molded with a minimum of mold equipment, to provide for torsional cushioning of the hinge pins, to facilitate assembly and disassembly of the track, to provide simplicity of construction, and to provide for convenience of manufacture.

These and other objects will appear from the following description and the accompanying drawing.

Of the drawing,

Fig. 1 is a side elevation of a track constructed in accordance with and embodying the invention, and showing driving, guiding and bogie wheels of a vehicle, parts being broken away.

Fig. 2 is a tread surface view of a portion of the track of Fig. 1.

Fig. 3 is a sectional view thereof, taken on line 3—3 of Fig. 2.

Fig. 4 is a sectional view taken on line 4—4 of Fig. 2.

Fig. 5 is a cross-sectional view taken on line 5—5 of Fig. 2, the driving sprockets and guiding wheel being shown in dot and dash lines.

Fig. 6 is a tread face view of a modified form of the invention, parts being broken away.

Fig. 7 is a cross-sectional view thereof taken on line 7—7 of Fig. 6.

Fig. 8 is a sectional view thereof, taken on line 8—8 of Fig. 6, parts being broken away.

Fig. 9 is a sectional view thereof taken on line 9—9 of Fig. 6, parts being broken away.

Fig. 10 is a sectional view taken on line 10—10 of Fig. 6, parts being broken away.

In accordance with the invention a track is formed of track blocks hinged to each other and provided with a retaining wall which surrounds a body of resilient cushioning material such as rubber having a high tractive coefficient. The enclosed resilient material may contact either with the ground to provide cushioning and traction or with the bogie wheels which support the vehicle to provide cushioning, or with both, and in the preferred form of the invention, the resilient material extends continuously through the track block from the tread face to the bogie wheel contacting face thereof so that the vehicle is supported on a column of rubber from the tread face of the track. The hinge pins are preferably provided with resilient torsion bushings extending through the track blocks and providing for flexure of the track without sliding friction and for cushioning of the track longitudinally.

Referring to the drawing, and first to Figs. 1 to 5 thereof, the track 10 is trained about a driving wheel 11 having sprocket teeth 12, a guiding wheel 13, and load supporting bogie wheels 14, 15, 16, 17. The track comprises a series of track blocks 18 pivotally connected to each other by hinge pins 19.

Each track block has a tread face 25 for engaging the ground, and an opposite wheel-engaging face 26. A central area of the track block is surrounded by substantially vertical walls 27, 28, 29, 30 of metal which are joined to each other at their ends and extend substantially normal to the tread face of the block from the tread face to the wheel-engaging face to define a box-like structure. A web 31 extends parallel to the tread face between the vertical walls to which it is secured and divides the central enclosed area to provide a cavity 32 open at the tread face and a cavity 33 open at the wheel-engaging face for receiving resilient material.

For connecting the track blocks to each other, a plurality of ears 35, 36, 37 are provided at one end of each block extending longitudinally from the wall 29 in spaced-apart relation, and the wall 30 of the block is formed with a pair of knuckles 40, 41 for engaging between the ears in intercalated relation. The knuckles 40, 41 are formed with aligned apertures for receiving torsion bushings 42, 43, and the ears 35, 36, 37 are formed with cross apertures of smaller bore in alignment with the apertures of the knuckles for receiving a hinge pin 44.

The bushings 42, 43 each comprise an inner sleeve 45 of metal flattened along one side, as at 46, a bushing 47 of soft vulcanized rubber or similar rubber-like material thereabout and preferably bonded thereto, as by vulcanization, and a split outer bushing 49 of metal bonded to the rubber-like material. The outer bushing 49 is preferably of semi-cylindrical bushing sections 49a, 49b. The bushings are forced into the apertures of the knuckles with the resilient bushing under radial compression. The hinge pin 44 is formed with a flat 50 along one side throughout its length to prevent its turning with relation to the inner sleeves 45 of the torsion bushings through which it slidably extends. The ends of the hinge pin are secured to the ears 35, 37 as by taper pins 51, 52 passing through the ears and the pin, or by other suitable fastening means. The arrangement is such that when one block is rotated about the hinge pin 44 of the adjacent block, the resilient bushing material is tensioned by the torsional movement.

For driving the track, each block extends at the sides of the box-like structure to provide wing portions 60, 61 which provide additional weight-supporting areas effective to support the vehicle on soft terrain but above the normal tread surface of the block, and these wings are provided with through apertures 62, 63 for engaging the sprocket teeth of the driving wheel. Webs 64, 65 formed on the tread face of the wings act as braces and also provide traction in soft ground into which they embed.

For guiding the track, upstanding guide lugs 66, 67 are formed integrally with the metallic frame and project on the wheel-contacting face of the block to engage over the sides of the guide wheels.

To provide greater traction on hard pavement, the tread face cavity 32 is filled at least flush with the tread faces of the surrounding metal walls with a resilient material having a high coefficient of friction with such pavement and preferably with a body of soft vulcanized rubber or other rubber-like material although a filling of fibrous material in the form of woven cloth or cord fabric with the cords exposed at the tread face and arranged in vertically disposed laminations adhered to each other by rubber or other plastic material or unadhered and clamped in place, or mixtures of rubber or other rubber-like material containing fibrous material, such as unwoven cotton fibers may be employed. It is preferred, however, to fill the cavity with a vulcanized rubber or other rubber-like composition vulcanized in place and flush with the tread surface edges of the retaining walls or projecting thereabove.

For retaining the resilient filling in place, the walls 27, 28, 29, 30 may have projections 70 formed thereon or reentrant grooves 71 formed therein for holding the filling in place. Alternatively, or in addition to the projections and grooves, the filling may be adhered to the metal as by a bond resulting from vulcanization and for this purpose the metal parts may be electroplated with brass and the rubber vulcanized thereto.

The arrangement is such that the enclosing walls of metal protect the resilient filling material from spreading excessively under heavy loads and from cracking and splitting or spalling at the margins under such loads while the metal enclosing walls will wear away at least as fast as the filling in use so that the filling is always available at the tread surface for providing increased traction. The preventing of cracking and spalling is of especial advantage where the filling is of vulcanized synthetic rubber or rubber-like materials not having great resistance to such splitting and spalling action.

For cushioning the track from the bogie wheels, an additional filling of similar resilient material, such as soft vulcanized rubber or other rubber-like material may be provided in the cavity 33 at the wheel-engaging face of the block and extending at least as high as the edges of the surrounding metal walls at such surface, and this filling may be similarly retained by projections, grooves, or bonding.

If desired for operation only on soft ground the filling of the cavity 32 may be omitted and the walls 27, 28, 29, and 30 will act as grousers while the resilient filling of the recess 33 will provide quiet operation and cushioning of the bogie wheels. Conversely, the cavity 32 may be filled with resilient material for providing cushioning of the track and increased traction and the filling of the recess 33 may be omitted.

For providing cushioned support of the bogie wheels directly from the road, the filling of resilient material in the cavities 32 and 33 may be integral and continuous so as to provide a solid column of rubber or other resilient material extending between the retaining walls 27, 28, 29, 30 from the tread face to the wheel-contacting face. For this purpose the web 31 may in some cases be omitted entirely. It is preferred, however, to retain the web 31 adjacent the retaining sidewalls for strengthening them and to provide apertures 75, 76 therethrough of considerable size through which the filling extends. With this construction, the weight of the bogie wheels will deform the resilient material and cause it to bulge beyond the normal tread plane at the tread face of the track whereby it will project beyond the retaining walls and the bogie wheels will be supported by resilient material directly from the ground despite the presence of the metal walls at the tread face.

For providing space for flow of the resilient material under pressure, the filling at the tread surface may be formed with flow cavities, such as the chevron-shaped grooves 77.

In the modified form of the invention shown in Figs. 6 to 10, the track is formed of track blocks each having a generally rectangular body defined by retaining walls 100, 101, 102, 103 normal to a face of the track and joined at their corners to provide a box-like structure extending from the tread face 104 to the wheel-contacting face 105 and providing a space for a filling 106 of resilient material such as vulcanized rubber or other rubber-like material, as in the form of the invention of Figs. 1 to 5. A partition 107, parallel to the tread face, extends between the retaining walls and may be formed with apertures 108, 109 therethrough to provide continuity of the filling as explained above. Wings 110, 111 are provided at the sides of the block and apertures 112, 113 are formed therethrough for engaging the sprocket teeth of a driving wheel for driving the track.

For guiding the track, a pyramidal projection 115 is formed integral with the metal frame of the block at its center for engaging between guide wheels. The projection may conveniently be formed on the partition 107 and extends through the resilient filling above the wheel-engaging face of the track.

For hinging the track blocks to each other, one end of each block is formed with a pair of knuckles 116, 117 formed from the wall 103 and having aligned apertures of large bore for receiving torsion bushing structures, each comprising a resilient torsion bushing 118 or 119 of rubber or other rubber-like material bonded to a shaft 120 extending through and beyond both bushings, and semi-cylindrical outer shell members 121, 122 bonded about the resilient bushings. The bushings 118, 119 are spaced apart as are the knuckles 116, 117 to provide space for a shaft retaining clip 125 of U-shape.

The opposite end of the track block is formed with bifurcated jaws 126, 127 at its opposite sides and a central jaw 128 of similar construction. A pair of retaining blocks 129, 130 are adapted to fit between the jaws 126, 127 respectively, where they are retained by screw bolts 131, 132 passing through the blocks and the jaws. The blocks 129, 130 have aligned apertures for receiving the ends of the shaft or hinge pin 120 which is fixed thereto as by taper pins 133, 134 passing through the hinge pin and the blocks. At the center of the track the U-shaped clip 125 is looped about the hinge pin between the torsion bushings, and its ends are inserted between the jaws 128 where they are retained by a screw bolt 136 passing therethrough. The arrangement is such that adjacent blocks may be separated by removing the three screw bolts 131, 132, 136.

The resilient torsion bushings are inserted in the knuckles under radial compression together with the hinge pin, the radial compression being sufficient to prevent turning of the outer shell members in the knuckles during use. The U-shaped clip employed at the central position between the knuckles may be inserted about the hinge pin after the bushings and the shaft have been pressed into position by pressure applied axially thereof.

The resilient filling material may be molded in place in either of the track blocks shown by the use of plain mold plates engaging the tread face and the wheel-engaging face respectively of the block to confine the material during vulcanization. A convenient molding procedure is by injection of the plastic material through an opening in one of the mold plates while the plates are bolted to the faces of the block. Heat may then be applied to the block as by placing the block and the enclosing mold plates in an open steam vulcanizer. If it is desired to provide the filling extending above the tread face or the wheel-engaging face of the block, cavities may be provided in the mold plates for accommodating the excess material.

The metallic frames of the track blocks shown are readily cast, forged, or assembled and welded, and require a minimum amount of machining.

Variations may be made without departing from the spirit of the invention as it is defined by the following claims.

We claim:

1. A track block for a self-laying track type vehicle in which a series of blocks are hingedly connected, said block comprising a metal frame having retaining walls extending substantially to a face of the block, a partition spaced from said face dividing the space between said retaining walls, said partition being apertured to provide a communicating opening therebetween, and a filling of resilient material in said space and extending between the tread face and the wheel-contacting face of the block.

2. A track block for a self-laying track type vehicle, said block comprising a metal frame having a retaining wall extending rigidly about the entire periphery of the block and substantially to the upper and lower faces of the block, partition means integral with said frame between its upper and lower faces for securing a filling thereto, said partition means having openings therethrough for accommodating said filling, and a filling of resilient rubber-like material retained by said wall, said filling being substantially entirely within said wall and extending through said partition with upper and lower faces of the filling substantially flush with and exposed at the upper and lower margins of the wall over a substantial area of both said faces of the block and providing load transmission through the filling directly from face to face thereof while being restrained from spreading by said retaining wall.

3. A track block for a self-laying track type vehicle, said block having opposite wheel-contacting and tread faces and comprising a metal frame having a retaining wall extending rigidly about the entire periphery of the block and substantially to both said faces of the block, partition means integral with said frame between said faces for securing a filling thereto, said partition means having openings therethrough for accommodating said filling, a filling of resilient rubber-like material retained by said wall, said filling being substantially entirely within said wall and extending through said partition with upper and lower faces of the filling substantially flush with and exposed at the upper and lower margins of the wall over a substantial area of both said faces of the block and providing load transmission through the filling directly from face to face while being restrained from spreading by said retaining wall, and guide means integral with said frame and said partition for aligning the block with a track-engaging wheel.

4. A track block for a self-laying track type vehicle, said block having opposite wheel contacting and tread faces and comprising a retaining wall extending rigidly about the wheel contacting portion thereof and substantially to both faces of the block, a filling of resilient rubber-like material retained by said wall, said filling being exposed over a substantial area of both wheel-contacting and tread faces of the block providing load transmission through the filling directly from face to face thereof while being restrained from spreading throughout substantially its entire depth by said retaining wall, and guide means within said retaining wall and integral therewith for aligning said filling with a wheel of the vehicle, said guide means providing support for said filling.

5. A track block for a self-laying track type vehicle, said block having opposite wheel contacting and tread faces and comprising a retaining wall extending rigidly about the wheel contacting portion thereof and substantially to both faces of the block, a filling of resilient rubber-like material retained by said wall, said filling being exposed over a substantial area of both wheel-contacting and tread faces of the block providing load transmission through the filling directly from face to face thereof while being restrained from spreading throughout substantially its entire depth by said retaining wall, partition means within said retaining wall, said partition means having openings therethrough for accommodating said filling, and guide means integral with said partition means for aligning said filling with a wheel of the vehicle.

6. A track block for a self-laying track type vehicle, said block having opposite wheel contacting and tread faces and comprising a retaining wall extending rigidly about the wheel contacting portion thereof and substantially to both faces of the block, a filling of resilient rubber-like material retained by said wall, said filling being exposed over a substantial area of both wheel-contacting and tread faces of the block providing load transmission through the filling directly from face to face thereof while being restrained from spreading throughout substantially its entire depth by said retaining wall, partition means within said retaining wall, said partition means having openings therethrough for accommodating said filling, guide means integral with said partition means for aligning said filling with a wheel of the vehicle, and wing tread portions integral with said retaining wall and extending laterally of the wheel-contacting face for increasing the area of contact with the ground.

CHARLES W. LEGUILLON.
ALVIN S. KROTZ.